US008071186B1

(12) United States Patent
Quimby

(10) Patent No.: US 8,071,186 B1
(45) Date of Patent: Dec. 6, 2011

(54) MODULAR ROLLOVER MAT

(76) Inventor: Martha M. Quimby, Washington, PA (US)

(*) Notice: Subject to any disclaimer, the term of this patent is extended or adjusted under 35 U.S.C. 154(b) by 0 days.

(21) Appl. No.: 12/858,869

(22) Filed: Aug. 18, 2010

(51) Int. Cl.
E04F 15/00 (2006.01)
F16B 2/00 (2006.01)

(52) U.S. Cl. .................. 428/33; 40/508; 52/177; 428/39
(58) Field of Classification Search .................... 40/508; 52/177; 428/33, 99
See application file for complete search history.

(56) References Cited

U.S. PATENT DOCUMENTS 3,909,996 A 10/1975 Ettlinger, Jr. et al.
4,287,693 A 9/1981 Collette
4,340,633 A * 7/1982 Robbins, Jr. .................... 428/99
5,052,158 A * 10/1991 D'Luzansky ................... 52/177
5,114,265 A 5/1992 Grisley
5,970,541 A 10/1999 Chiang
6,103,333 A 8/2000 Keith
6,319,592 B1 11/2001 Ney et al.
6,505,444 B1 1/2003 Johnson
2008/0263922 A1 * 10/2008 Ho et al. ......................... 40/508

* cited by examiner

Primary Examiner — Brent O'Hern

(57) ABSTRACT

A modular rollover mat comprises a plurality of interconnecting mat sections, each having a plurality of connection portions and a retaining rail assembly. Each of the plurality of mat sections comprises a hard top material for providing a smooth and durable rolling surface for computer chairs and the like. The sections engage each other in order to selectively connect separate floor mats together. The retaining rail comprises a raised edging located along the perimeter of the connected floor mat sections.

15 Claims, 4 Drawing Sheets

MODULAR ROLLOVER MAT

RELATED APPLICATIONS

The present invention was first described in a notarized Official Record of Invention on Sep. 28, 2009, that is on file at the offices of Montgomery Patent and Design, LLC, the entire disclosures of which are incorporated herein by reference.

FIELD OF THE INVENTION

The present invention relates generally to floor mats, and in particular, to a modular rollover floor mat for use with chairs.

BACKGROUND OF THE INVENTION

The use of rolling desk chairs is a common site in almost any office environment. Typically these rolling desk chairs include castors affixed to each leg which allow the chair to glide along the floor surface. While these chairs roll easily on hard tile or wood surfaces they are extremely difficult to roll when used on carpeted surfaces. As such, it is common to resort to the use of hard plastic chair mats to facilitate rolling as well as to protect the flooring surface. Unfortunately, the visual appearance of such floor mats is very aesthetically unappealing. These mats are usually fabricated from rigid vinyl or laminate and can crack or otherwise become damaged over time. Additionally, these mats are usually large and heavy and are often difficult to store, move, or fit into smaller rooms. Once furniture is in place, it can be almost impossible to properly position these unwieldy mats. Another disadvantage of conventional chair mats is situations where the chair rolls off of the edge of the mat and onto the carpeted surface, which often times requires the user to stand up and physically position the chair back upon the mat.

Some mats have attempted to solve some of these problems, such as including decorative visual elements to provide some aesthetically appealing characteristics or providing pliable materials having a smooth surface which lay on the carpeted surface. Examples of these mats can be seen by reference in U.S. Pat. Nos. 6,103,333, issued in the name of Keith, which discloses a wood veneer laminated chair mat; and, 6,319,592, issued in the name of Ney et al., which discloses a decorative floor mat for use with a chair. While these mats may accomplish there intended purpose, the problem of portability and convenient positioning remain.

Other floor mats and tile systems provide a plurality of interconnecting members. These mats are typically intended for use as play mats or other floor coverings and provide a cushioned material. Examples can also be seen by reference in U.S. Pat. Nos. 3,909,996, issued in the name of Ettinger, Jr. et al., which describes a modular floor mat; 4,287,693, issued in the name of Collette, which describes an interlocking rubber mat; 5,052,158, issued in the name of D'Luzansky, which describes a modular locking floor covering; and, 5,970,541, issued in the name of Chiang, which describes a modular mat. While these mats provide varying degrees of modularization which may make them more portable, none are suited for use with rolling chairs.

All of these devices may accomplish their specific intended purpose; however, each suffers from one (1) or more disadvantage or deficiency with respect to design, function, or effectiveness. Accordingly, there exists a need for a means by which the protective features of office chair floor mats can be provided without the aforementioned disadvantages. The development of the present invention substantially departs from the conventional solutions and in doing so fulfills this need.

SUMMARY OF THE INVENTION

In view of the foregoing references, the inventor recognized the aforementioned inherent problems and lack in the art and observed that there is a need for a system which protects a carpeted floor while allowing rolling desk chairs to easily glide from one location to the next. Thus, the object of the present invention is to solve the aforementioned disadvantages and provide for this need.

Another object of the present invention is to provide a system which provides an aesthetically pleasing appearance to an office or other room.

Yet another object of the present invention is to provide a system which is modular and thus easily transported, positioned, and stored at a desired location, particularly, in locations having limited space.

Yet another object of the present invention is to provide a system which is easily assembled and disassembled and requiring no special tools or instruction.

Yet another object of the present invention is to provide a system which includes various modular set-up configurations to provide desired floor coverage.

Yet another object of the present invention is to provide a system which provides a means of preventing the rolling desk chair from rolling off an edge and onto the carpeted surface.

Yet still another object of the present invention is to provide a system which is simple and intuitive to use with little to no training.

Yet still another object of the present invention is to provide a system which is durable and economical to manufacture.

One (1) or more of these and other objects of the invention are achieved by a preferred embodiment of the system providing a modular rollover mat comprising a planar center member, four (4) planar generally square corner members disposed radially around the center member, and four (4) planar generally square interlocking members removably connected between two (2) adjacently positioned corner members. Each corner members includes an arcuate cutout between two (2) interior edge portions for mating to an edge portion of the center member. An interior edge portion of each corner member also includes a generally square cutout for mating to the interlocking member and a triangular connecting cutout projecting inwardly from the square cutout which removably interconnects with a triangular connecting tab projecting outwardly from side edge portions of each interlocking member. The connecting tabs removably connect to a correspondingly adjacent connecting cutout such that all members are connected to provide a rigid and durable contiguous planar surface.

In at least one (1) embodiment these objects are achieved by providing a border extending upwardly from a top surface of each member which mates to one (1) another when each member is connected, such that the border forms a contiguous border around an outside perimeter of the entire modular rollover mat.

In at least one embodiment these objects are achieved by providing a generally "T"-shaped planar extension member removably connected to two (2) adjacently positioned corner members in place of at least one (1) interlocking member.

In at least one (1) embodiment these objects are achieved by providing the bottom surfaces of each member having a plurality of conical-shaped protrusions projecting outwardly for anchoring to a carpeted surface.

Furthermore, the described features and advantages of the invention may be combined in various manners and embodiments as one skilled in the relevant art will recognize. The invention can be practiced without one (1) or more of the features and advantages described in a particular embodiment.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

| | |
|---|---|
| 10 | modular rollover mat |
| 15 | user |
| 16 | chair |
| 17 | work surface |
| 20 | center member |
| 30 | corner member |
| 31 | first cutout |
| 32 | second cutout |
| 33 | corner cutout |
| 34 | center cutout |
| 35 | corner portion border |
| 40 | interlocking member |
| 41 | first side tab |
| 42 | second side tab |
| 43 | front tab |
| 45 | interlocking member border |
| 46 | extension |
| 47 | extension border |
| 50 | protrusion |

DETAILED DESCRIPTION OF THE PREFERRED EMBODIMENT

The best mode for carrying out the invention is presented in terms of its preferred embodiment, herein depicted within FIGS. 1 through 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a modular rollover mat (herein described as the "system") 10, preferably utilized with a rolling desk chair 16 comprising an office seat having casters.

Figure 1:
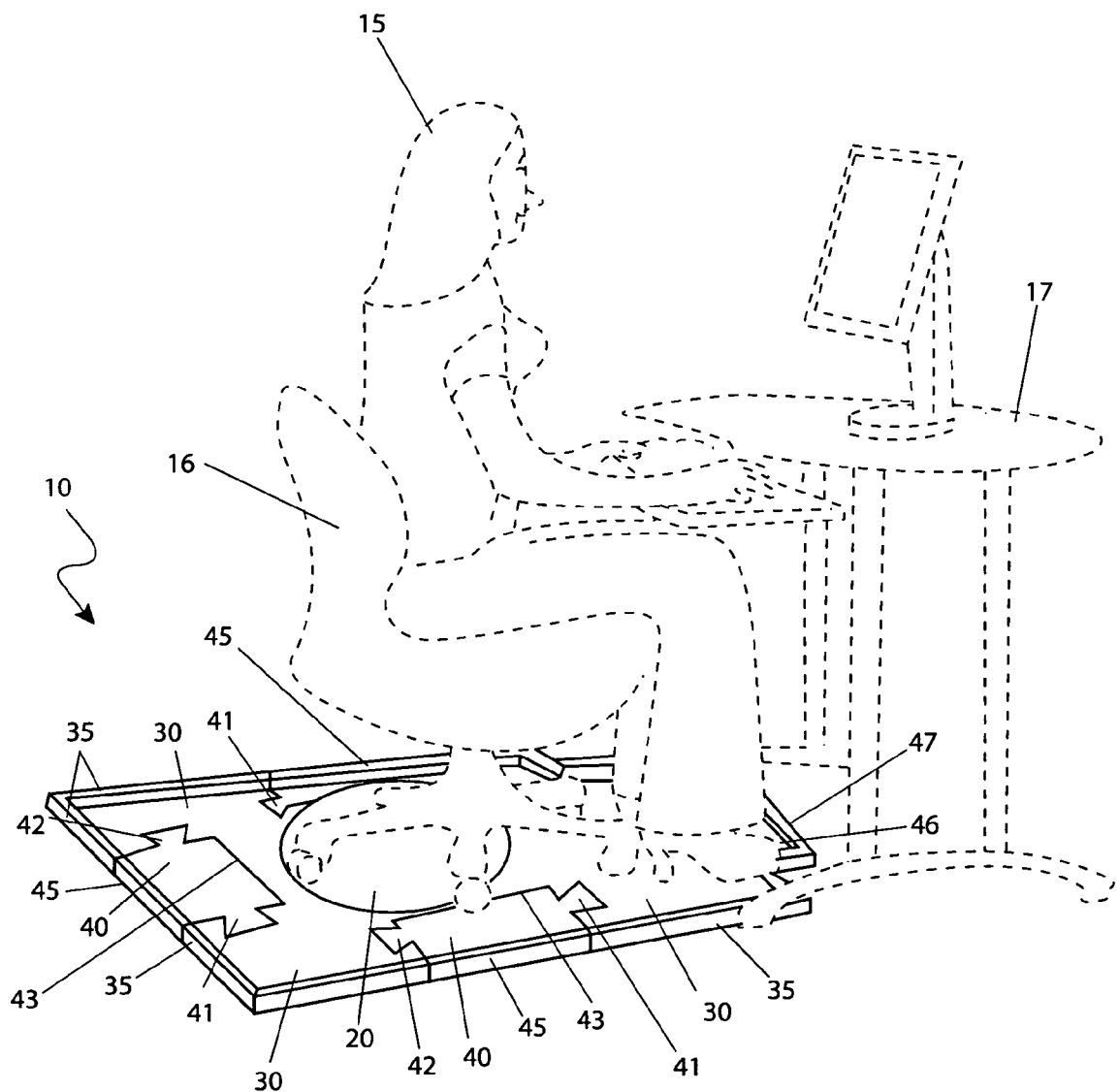
FIG. 1 is an environmental view of a modular rollover mat 10, according to a preferred embodiment of the present invention.

Referring now to FIG. 1, an environmental view of the system 10, according to the preferred embodiment of the present invention, is disclosed. The system 10 enables the chair 16 to roll freely on carpeted flooring and is modular which may be disassembled in a manner similar to a jigsaw puzzle for storage or shipping purposes. The system 10 protects the flooring surface from rolling office chairs 16 and enables the chairs 16 to travel with ease without the aesthetically unappealing appearance of conventional methods. The system 10 comprises a center member 20, a plurality of corner members 30, a plurality of interlocking members 40, an extension 46, and a plurality of protrusions 50. The system 10 is preferably manufactured in a variety of dimensions to accommodate various spaces and chair mobility.

Figure 2:
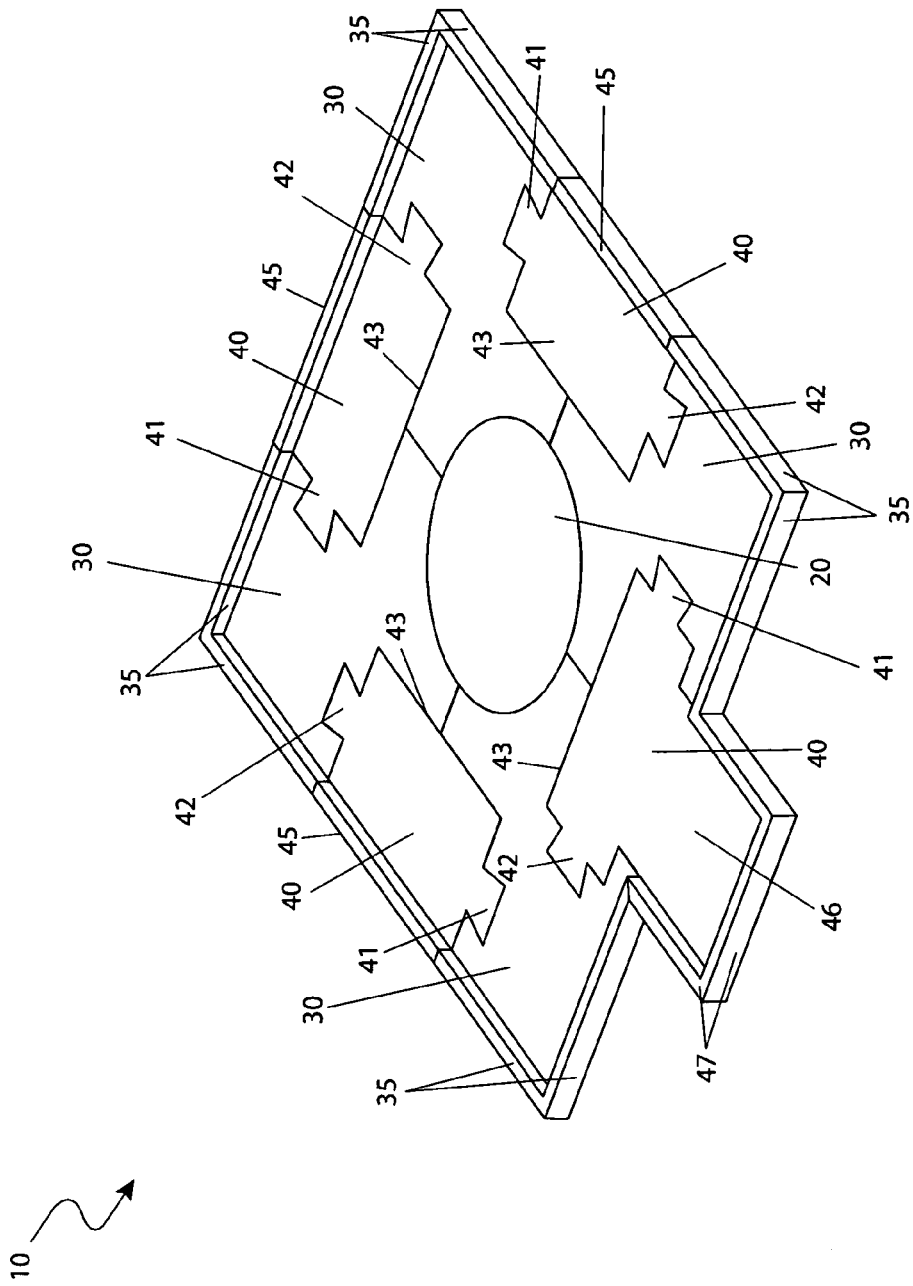
FIG. 2 is a perspective view of the modular rollover mat 10, according to a preferred embodiment of the present invention.
Figure 3:
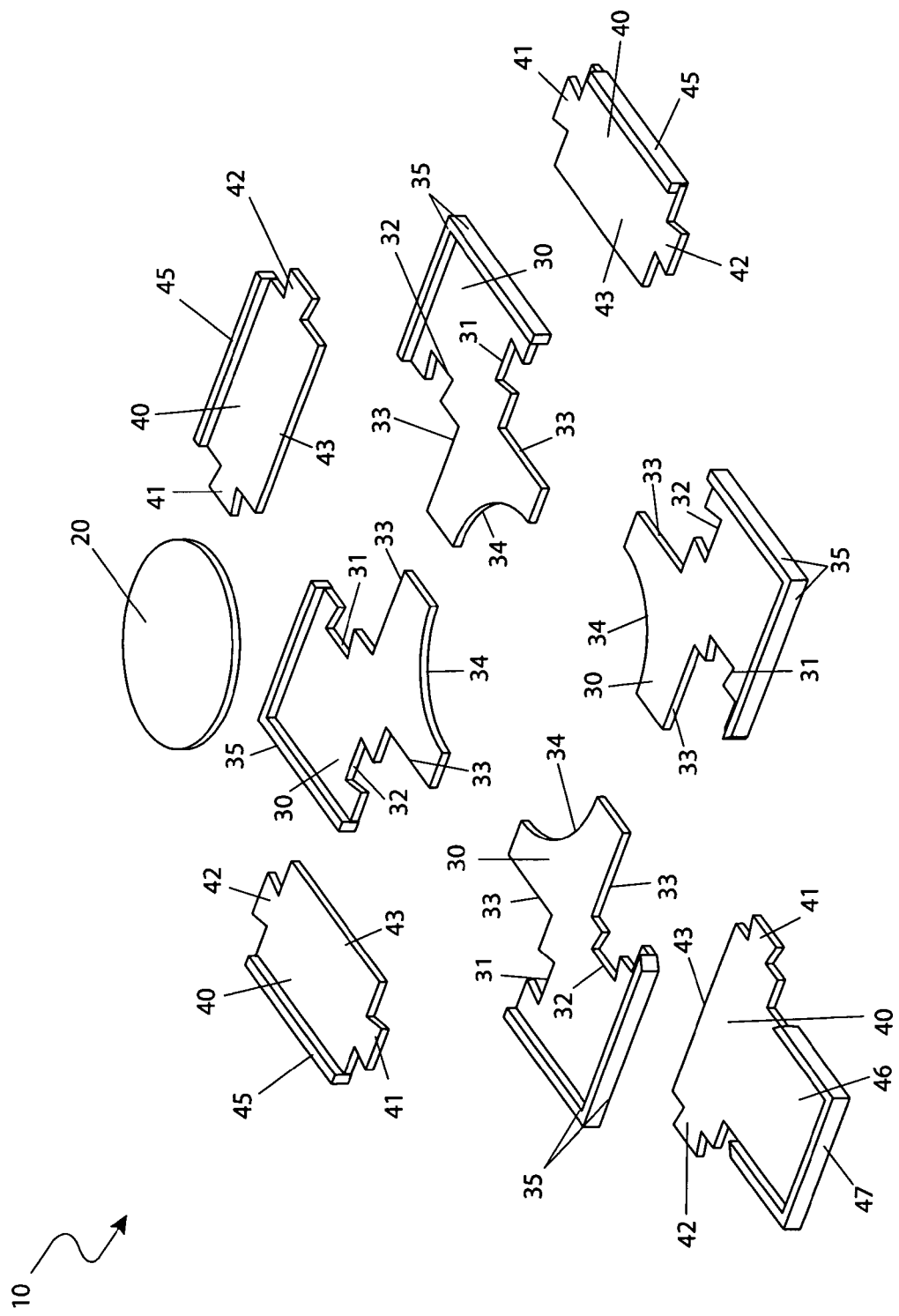
FIG. 3 is an exploded view of the modular rollover mat 10, according to a preferred embodiment of the present invention; and, FIG. 4 is an underside perspective view of the modular rollover mat 10, according to a preferred embodiment of the present invention.

Referring now to FIG. 2, a perspective view of the system 10 and FIG. 3, an exploded view of the system 10, according to the preferred embodiment of the present invention, are disclosed. The system 10 is preferably fabricated from a durable plastic, yet other materials such as wood may be utilized without limiting the scope of the system 10. The system 10 comprises a center member 20 which provides for a decorative seamless initial structural member for the chair 16 to travel upon. The center support 20 comprises a flattened, circular shape and enables each corner member 30 to abut an outer circumferential perimeter edge of the center support 20. Although illustrated herein as depicting the corner members 30 abutting against the center support 20 it is known that other attachment means may be utilized without limiting the scope of the system 10. An upper surface of the center member 20 may comprise indicia which may provide script or logos based upon a user's preference and may include images such as, but not limited to: sports names or logos, personal names, symbols, pictures, and the like to further customize and personalize the apparatus 10 further comprising a variety of colors and patterns.

The system 10 also comprises a plurality of corner members 30 which provide a region for the chair 16 to travel upon. The corner members 30 encompass the center member 20 and extend outwardly forming a rectangular boundary for the chair 16 to travel. Each corner member 30 comprises an arcuate center cutout 34 corresponding to the circumferential perimeter edge of the center member 20. The center cutouts 34 are located on an inner portion of each corner member 30. Each corner member 30 also comprises a corner portion border 35 on outer perimeter edges which provide a curbing means to the system 10. The border 35 extends upwardly from each corner member 30 to deter the chair 16 from traveling beyond the border 35. The border 35 is preferably integrally molded to each corner member 30, yet other attachment means may be utilized without limiting the scope of the system 10. Each corner member 30 also comprises a first cutout 31, a second cutout 32, and a pair of corner cutouts 33 to provide an attachment means to corresponding interlocking members 40 and the extension 46 which enable the system 10 to be secured. An upper surface of the corner members 20 may comprise indicia which corresponds to the center member 20 which may also provide script or logos based upon a user's preference and may include images such as, but not limited to: sports names or logos, personal names, symbols, pictures, and the like to further customize and personalize the apparatus 10 further comprising a variety of colors and patterns.

The system 10 also comprises a plurality of interlocking members 40 which provide an attachment means to the corner members 30 and enable the system 10 to be secured. Each interlocking member 40 comprises a generally "T"-shaped body further comprising a first side tab 41, a second side tab 42, a front tab 43, and an interlocking member border 45. Each interlocking member 40 engages a pair of corner members 30 on opposing sides of the interlocking members 40 via engaging a tab 41, 42, 43 with a corresponding cutout 31, 32, 33. The first tab 41 on each interlocking member 40 engages the first cutout 31 on each corner member 30, the second tab 42 on each interlocking member 40 engages the second cutout 32 on each corner member 30, and the front tab 43 on each interlocking member 40 engages the corner cutout 33 on each corner member 30. The first tab 41 and second tab 42 comprise a triangular-shape and the front tab 43 comprises a rectangular-shape for illustration purposes only; it is known that other shapes may be utilized without limiting the scope of the system 10. The cutouts 31, 32, 33 are the negative shape of the tabs 41, 42, 43 which enable the tabs 41, 42, 43 to engage the cutouts 31, 32, 33 and further secure each corner member 40 and center member 30 as a stable unit. The interlocking member border 45 extends upwardly from each interlocking member 40 and aligns with the border 35 on each corner member 30 to form a rectangular cohesive boundary to prohibit a chair 16 from traveling beyond the borders 35, 45. Each interlocking member 40 may also comprise indicia corresponding to the center member 20 and corner members 30 as above-mentioned.

The system 10 also comprises an extension 46 which provides further attachment means to the corner members 30 and enables the system 10 to be secured. The extension 46 also provides a means to place the user's feet during use. The extension 46 is preferably positioned under a work surface 17 (see FIG. 1) where the user's feet rest when in a sitting position, yet other positions may be utilized without limiting the scope of the system 10. The extension 46 comprises an extension border 47 which protrudes on the outer perimeter edges and provides further curbing means to the system 10. The extension border 47 extends upwardly from the extension 46 to further deter the chair 16 from traveling beyond the extension border 47. The extension border 47 is preferably integrally molded to the extension 46, yet other attachment means may be utilized without limiting the scope of the system 10. Integrally molded to the extension 46 is an interlocking member 40 which comprises abovementioned features. The interlocking member 40 enables the extension 46 to be secure to a pair of corner members 30 as described above. The interlocking member 40 is preferably integrally molded to the extension 46, yet other means of attachment may be utilized without limiting the scope of the system 10.

Figure 4:
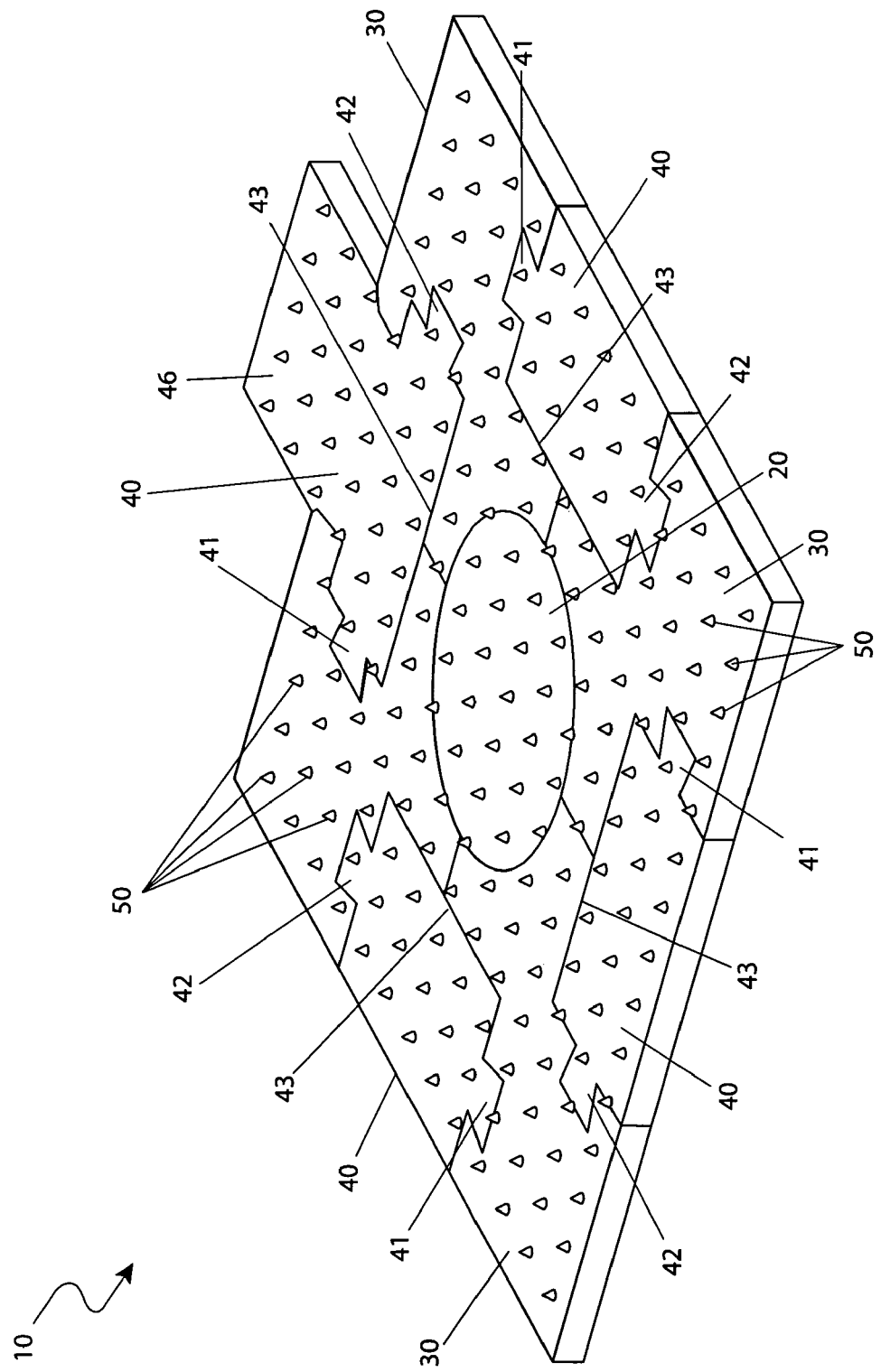

Referring now to FIG. 4, an underside perspective view of the system 10, according to the preferred embodiment of the present invention, is disclosed. The underside surface of the system 10 comprises a plurality of protrusions 50 which enable the system 10 to grip carpeted flooring to provide an anchoring means. The protrusions 50 preferably comprise a conical shape, yet other shapes may be utilized without limiting the scope of the system 10. The protrusions 50 are to be evenly spaced and integrally molded to the underside of each member 20, 30, 40 and extension 46. The protrusions 50 extend downwardly from the underside of the system 10 to prohibit the system 10 from moving in the x-axis or y-axis during use via gripping the carpeted flooring.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the system 10, it would be installed as indicated in FIGS. 1 through 4.

The method of installing and utilizing the system 10 may be achieved by performing the following steps: acquiring the system 10; positioning the center member 20 on a desired level surface; positioning each corner member 30 around the circumference of the center member 20 with the center cutout 34 facing toward the outer perimeter edge of the center member 20 and the border 35 upwardly facing; positioning each interlocking member 40 and extension 46 between a pair of corner members 30 with the interlocking member border 45 upwardly facing; engaging the first tab 41 on the interlocking member 40 with the first cutout 31 on the corner member 30, engaging the second tab 42 on the interlocking member 40 with the second cutout 32 on the corner member 30, and engaging the front tab 43 on the interlocking member 40 with the corner cutout 33 on the corner member 30; positioning a chair 16 upon the upper surface of the system 10 as desired; and, utilizing the system 10 to protect the desired flooring from chairs 16 or enabling a chair 16 to travel upon carpeting in a convenient and appealing manner.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:
1. A modular rollover mat comprising:
a planar center member having a top surface, a bottom surface, and a generally circular edge portion;
a plurality of planar corner members disposed adjacently to said center member, each corner member having a top surface, a bottom surface, an edge portion, a pair of cutouts disposed in said corner member edge portion on adjacent sides, and a corner border protruding upwardly from said corner member top surface and extending around an outside perimeter edge portion;
a plurality of planar interlocking members removably connected to said plurality of corner members, each interlocking member having a top surface, a bottom surface, an edge portion, a pair of tabs protruding outwardly from said edge portion on opposing sides, and an interlocking border protruding upwardly from said interlocking member top surface and extending along an outside perimeter edge portion; and,
wherein each tab removably interlocks with a corresponding cutout for removably connecting one interlocking member between two adjacently positioned corner members;
wherein when said plurality of planar corner members and said plurality of planar interlocking members are inter- connected, they fully surround said planar center member to provide a rigid and durable contiguous planar surface; and, wherein said corner borders and said interlocking borders mate to form a contiguous border around an outside perimeter of said modular rollover mat.

2. The modular rollover mat of claim 1, wherein said tabs and said cutouts further comprise a generally triangular shape.

3. The modular rollover mat of claim 1, wherein said plurality of corner members each further comprises a generally square-shaped body having an outer corner, an inner corner opposite said outer corner, and a pair of opposing side corners.

4. The modular rollover mat of claim 3, wherein said corner member inner corner further comprises an arcuate cutout suitable to match a one-quarter of said center member edge portion; and, wherein said corner member edge portion between said inner corner and said side corners further comprises a generally square cutout suitable to match a side edge portion of said interlocking member.

5. The modular rollover mat of claim 1, wherein said plurality of interlocking members each further comprises a generally square-shaped body having an inside portion, an outside portion opposite said inside portion, and two opposing side portions.

6. The modular rollover mat of claim 1, wherein said center member bottom surface, said plurality of corner members bottom surface, and said plurality of interlocking members bottom surface further comprise a plurality of protrusions.

7. The modular rollover mat of claim 6, wherein said plurality of protrusions each further comprises a conical-shaped projection for anchoring to a carpeted surface.

8. The modular rollover mat of claim 1, further comprising a planar extension member removably connected to said two adjacently positioned corner members.

9. The modular rollover mat of claim 8, wherein said extension member further comprises a generally T-shaped body having a stem portion and a head portion; and, wherein said extension member head portion further comprises an extension border protruding from a top surface of said extension member and extending around an outside perimeter edge potion.

10. The modular rollover mat of claim 1, wherein said plurality of corner members each further comprises a generally square-shaped body having an outer corner, an inner corner opposite said outer corner, and a pair of opposing side corners;

wherein said plurality of interlocking members each further comprises a generally square-shaped body having an inside portion, an outside portion opposite said inside portion, and two opposing side portions;

wherein said corner member inner corner further comprises an arcuate cutout suitable to match a one-quarter of said center member edge portion; and, wherein said corner member edge portion between said inner corner and said side corners further comprises a generally square cutout to match a side edge portion of said interlocking member.

11. The modular rollover mat of claim 10, further comprising a planar extension member removably connected to said two adjacently positioned corner members;

wherein said extension member further comprises a generally T-shaped body having a stem portion and a head portion;

wherein said extension member head portion further comprises an extension border protruding from a top surface of said extension member and extending around an outside perimeter edge potion; and, wherein said corner border, said interlocking border, and said extension border mate to form a contiguous border around an outside perimeter of said modular rollover mat.

12. The modular rollover mat of claim 11, wherein said center member bottom surface, said plurality of corner members bottom surface, and said plurality of interlocking members bottom surface further comprise a plurality of conical-shaped protrusions projecting outwardly for anchoring to a carpeted surface.

13. A modular rollover mat comprising:

a planar center member having a top surface, a bottom surface, and a generally circular edge portion;

four planar generally square corner members disposed radially around said center member, each corner member having a top surface, a bottom surface, two exterior edge portions, and two interior edge portions; and, four planar generally square interlocking members removably connected between two adjacently positioned corner members, each interlocking member having a top surface, a bottom surface, an interior edge portion, an exterior edge portion, and two opposing side edge portions;

wherein each of said corner members further comprises an arcuate cutout between said two interior edge portions for mating to one-quarter of said center member edge portion;

wherein each of said corner member interior edge portion further comprises a generally square cutout for mating to said interlocking member side edge portion and a triangular connecting cutout projecting inwardly from said square cutout;

wherein each interlocking member side edge portion further comprises a triangular outwardly projecting connecting tab;

wherein each connecting tab removably connects to a correspondingly adjacent connecting cutout;

wherein when said plurality of planar corner members and said plurality of planar interlocking members are interconnected, they fully surround said planar center member to provide a rigid and durable contiguous planar surface;

wherein said plurality of corner members each further comprises a corner border protruding from said corner member top surface and extending around an outside perimeter edge portion between said pair of opposing side corners;

wherein said plurality of interlocking members each further comprises an interlocking border protruding from said interlocking member top surface and extending along an outside perimeter edge portion; and, wherein said corner border and said interlocking border mate to form a contiguous border around an outside perimeter of said modular rollover mat.

14. The modular rollover mat of claim 13, further comprising a planar extension member removably connected to said two adjacently positioned corner members in place of at least one interlocking member, said extension member having a top surface, a bottom surface, and an edge portion;

wherein said extension member further comprises a generally T-shaped body having a stem portion and a head portion;

wherein said extension member head portion further comprises an extension border protruding from said extension member top surface and extending around an outside perimeter edge potion; and, wherein said corner border, said interlocking border, and said extension border mate to form a contiguous border around an outside perimeter of said modular rollover mat.

15. The modular rollover mat of claim 14, wherein all of said bottom surfaces further comprise a plurality of conical-shaped protrusions projecting outwardly for anchoring to a carpeted surface.

* * * * *